United States Patent
Barbehenn et al.

(10) Patent No.: US 7,679,874 B2
(45) Date of Patent: Mar. 16, 2010

(54) POWER OVERLOAD DETECTION METHOD AND STRUCTURE THEREFOR

(75) Inventors: George H. Barbehenn, Gilbert, AZ (US); John D. Stone, Mesa, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 561 days.

(21) Appl. No.: 11/188,093

(22) Filed: Jul. 25, 2005

(65) Prior Publication Data
US 2007/0019343 A1    Jan. 25, 2007

(51) Int. Cl.
*H02H 3/00* (2006.01)
(52) U.S. Cl. .......................................... 361/86
(58) Field of Classification Search .................. 361/86
See application file for complete search history.

(56) References Cited

U.S. PATENT DOCUMENTS

| | | | |
|---|---|---|---|
| 5,430,364 A * | 7/1995 | Gibson | 323/207 |
| 5,497,127 A * | 3/1996 | Sauer | 331/17 |
| 6,137,696 A | 10/2000 | Hall et al. | |
| 6,344,980 B1 | 2/2002 | Hwang et al. | |
| 6,385,060 B1 | 5/2002 | Basso et al. | |
| 6,469,914 B1 | 10/2002 | Hwang et al. | |
| 6,525,514 B1 | 2/2003 | Balakrishnan et al. | |
| 6,525,948 B2 | 2/2003 | Hsu | |
| 6,580,593 B2 | 6/2003 | Balakrishnan | |
| 6,597,221 B2 | 7/2003 | Hall et al. | |
| 6,639,812 B2 | 10/2003 | Nakazawa et al. | |
| 6,667,605 B2 | 12/2003 | Balakrishnan et al. | |
| 6,784,646 B2 | 8/2004 | Balakrishnan et al. | |
| 6,980,444 B2 * | 12/2005 | Takahashi | 363/21.18 |
| 7,116,564 B2 * | 10/2006 | Takahashi | 363/21.16 |

OTHER PUBLICATIONS

Data Sheet "NCP1231 Low-Standby Power High Performance PWM Controller", Semiconductor Components Industries, LLC, Jun. 2004-Rev.1, pp. 1-20.

* cited by examiner

*Primary Examiner*—Fritz M. Fleming
*Assistant Examiner*—Lucy Thomas
(74) *Attorney, Agent, or Firm*—Robert F. Hightower

(57) ABSTRACT

In one embodiment, the bulk input voltage is used to form a reference signal that is used for controlling a switching power supply system to operate in a power overload operating mode.

20 Claims, 2 Drawing Sheets

US 7,679,874 B2

POWER OVERLOAD DETECTION METHOD AND STRUCTURE THEREFOR

BACKGROUND OF THE INVENTION

The present invention relates, in general, to electronics, and more particularly, to methods of forming semiconductor devices and structure.

In the past, the semiconductor industry utilized various methods and structures to implement skip cycle detection and output power overload detection in switching power supply systems such as pulse width modulated (PWM) systems. Skip cycle detection, often referred to as burst-mode detection, was often used to reduce power dissipation in the power supply system during light output load conditions. Power overload detection was used to determine if the amount of output power supplied by the system was greater than the desired maximum power dissipation that was allowable by the particular implementation of the power supply system. One example of a switching power supply controller that had both power overload detection and skip cycle detection was the NCP1231 supplied by ON Semiconductor of Phoenix, Ariz.

Output power overload detection methods generally compared the value of a signal representative of the output voltage formed by the power supply system to a fixed reference voltage within the power supply controller. One problem with this method was that the output power delivered to the load could also increase if the value of the bulk input voltage supplied to the power supply system changed. In such a situation, the power supply controller of the power supply system could not accurately detect the power overload condition.

Skip cycle detection circuits also generally compared a signal representative of the value of the output voltage to a fixed reference voltage within the power supply controller. If the value of the bulk input voltage supplied to the power supply system changed, the skip cycle detection method could cause the power supply system to enter the skip cycle mode before the power required by the load decreased to the desired value. Consequently, the power supply system would not supply enough power to the load.

Accordingly, it is desirable to have a power supply control system and method that more accurately detects the power supplied by the power supply control system, that accurately detects the power supplied by the power supply control system when the bulk input voltage changes, and that more accurately detects the load power at which to enter the skip cycle mode.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
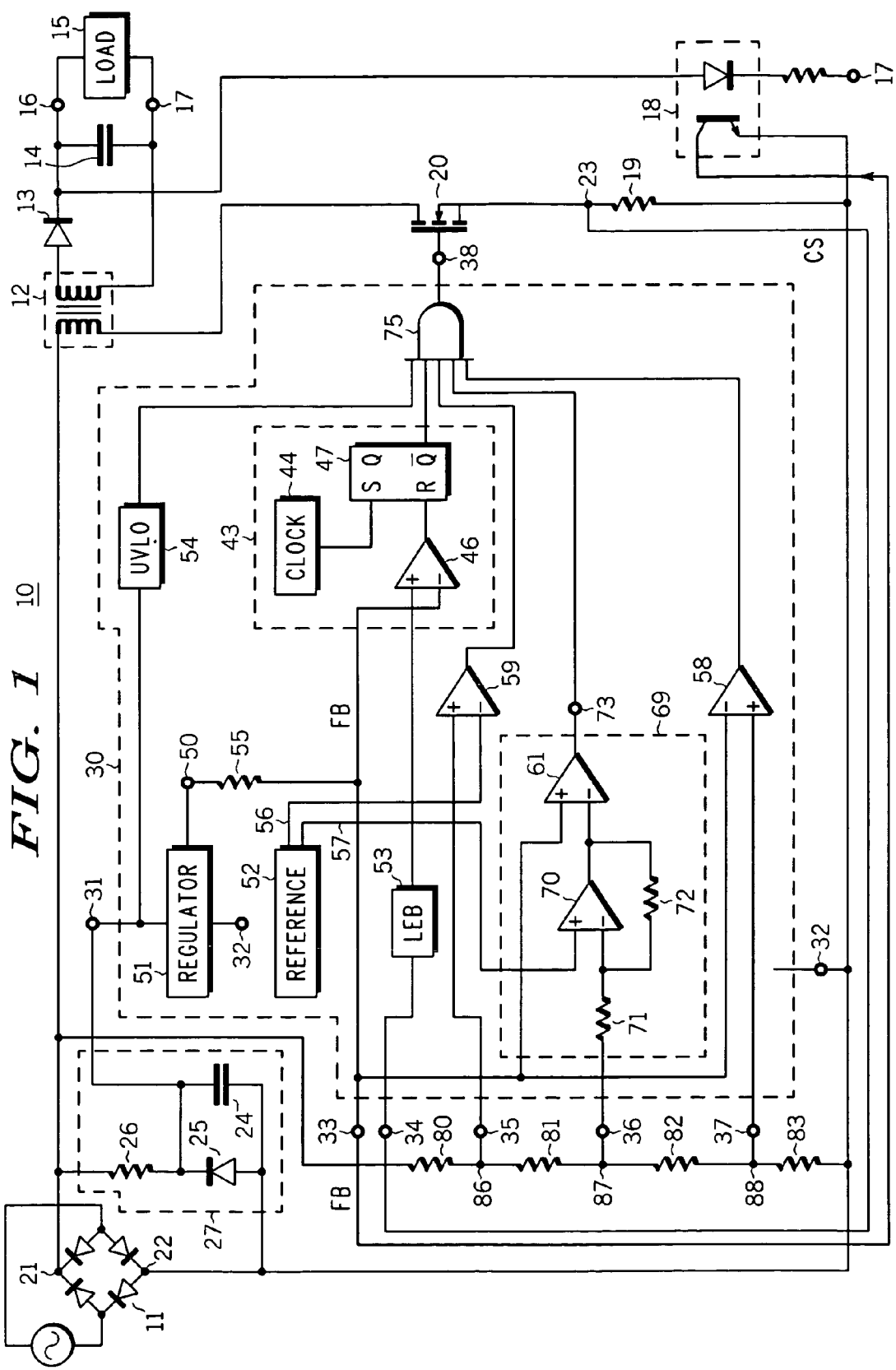
FIG. 1 schematically illustrates a portion of an embodiment of a power supply control system in accordance with the present invention.

FIG. 1 schematically illustrates a portion of an embodiment of a switching power supply control system 10 that includes a switching power supply controller 30. System 10 generally receives power from a power source such as a household mains. A bridge rectifier 11 may rectify the voltage from the power source and supply a bulk voltage between a voltage input node 21 and voltage return node 22. System 10 typically receives the bulk voltage and forms an output voltage between a voltage output 16 and a voltage return 17. As will be seen further hereinafter, controller 30 of system 10 is configured to use the value of the bulk voltage to facilitate more accurately detecting if the amount of power supplied by system 10 is greater than a desired maximum power dissipation for system 10. Controller 30 is also configured to use the value of the bulk voltage to facilitate more accurately detecting if the power required by a load 15 connected to system 10 is below a desired value at which system 10 should enter the skip cycle mode of operation. More accurately detecting the power assists in minimizing the power dissipation and increases efficiency.

System 10 typically includes a transformer 12, that has a primary winding and a secondary winding, and a power switch or power transistor 20 that is connected to the primary winding. Transistor 20 is switched by controller 30 in order to regulate the value of the output voltage between output 16 and return 17. A rectifying diode 13 and a filter capacitor 14 typically are connected to the secondary winding to assist in forming the output voltage. Load 15 generally is connected to system 10 between output 16 and return 17 to facilitate receiving power from system 10. An operating voltage regulator 27, illustrated by a resistor 26, a zener diode 25, and a capacitor 24, may be coupled between nodes 21 and 22 to form an operating voltage for use in operating controller 30. In some embodiments, regulator 27 may have other configurations or may be omitted. A feedback network of system 10 provides a feedback (FB) signal that is representative of the value of the output voltage between output 16 and return 17. The exemplary embodiment of the feedback network illustrated in the embodiment of FIG. 1 includes an optical coupler 18 that has an optical diode connected between output 16 and return 17 and an optical transistor that is connected to provide the FB signal. A resistor may be connected to the optical emitter to assist in forming the FB signal. For the example embodiment illustrated in FIG. 1, a resistor 55 within controller 30 is used as a pull-up for the FB signal. A current sensing resistor 19 typically is connected to transistor 20 in order to form a current sense (CS) signal that is representative of the current through transistor 20 and transformer 12. Transistor 20, resistor 19, and the feedback network typically are external to controller 30 although in some embodiments some all or a portion of transistor 20, resistor 19, and the feedback network may be formed as a portion of controller 30.

Controller 30 is configured to generate a switching control signal on a switching output 38 that typically is connected to control the switching of transistor 20 in order to regulate the output voltage on output 16. In order to facilitate this operation, controller 30 generally includes elements such as a switching controller 43, a reference voltage generator or reference 52, an internal regulator 51, a skip comparator 58, a power overload detection circuit 69, and a logic control circuit that is utilized to control the operating state of controller 30 and the operation of the switching control signal used to drive transistor 20. In the embodiment illustrated in FIG. 1, the logic control circuit is illustrated by an AND gate 75, but may have various other logic control elements in other embodiments. Controller 43 includes a clock generator or clock 44 that generates a fixed frequency clock for controlling the operation of controller 30, a comparator 46, and a latch 47 that assist in forming the switching control signal on output 38. Although controller 43 is illustrated as a fixed frequency current mode controller, those skilled in the art will appreciate that other types of controllers, such as a voltage mode PWM controller or a quasi-resonant controller, may be used. In most embodiments, controller 30 may include other well-known switching power supply control circuits such as an optional leading edge blanking circuit (LEB) 53, a fault detection circuit, a thermal shut-down circuit, a ramp generator, a brown-out circuit that is illustrated by a brown-out comparator 59, and an under-voltage lock-out circuit (UVLO) 54. Controller 30 may also include other well-known switching power supply control circuits that are not shown in FIG. 1 such as a soft-start circuit.

Controller 30 generally receives an input voltage from external regulator 27 between a power input 31 and a power return 32. Typically, return 32 is connected to node 22. Internal regulator 51 is connected between input 31 and return 32 to receive the input voltage from input 31 and form an internal operating voltage for operating the elements of controller 30 such as comparator 58, circuit 69, reference 52, and controller 43. Reference 52 generates reference signals for use by other portions of controller 30 including a first reference signal and a second reference signal on respective first output 56 and second output 57 of reference 52. Controller 30 also receives the feedback (FB) signal on a feedback input 33 and receives the current sense (CS) signal on a current sense input 34.

In normal operation, controller 30 receives the FB signal and the CS signal and forms the switching control signal to regulate the output voltage on output 16. As is well known in the art, clock 44 generates a periodic clock that sets latch 47 to begin enabling transistor 20. Comparator 46 receives the FB signal and the CS signal and resets latch 47 when the value of the CS signal has reached the value of the FB signal. This operation of controller 43 is well known by those skilled in the art.

If the power consumed by load 15 is greater than a desired or rated maximum output power dissipation value, the power consumed by system 10 may be excessive and should be reduced in order to prevent damaging portions of system 10. Power overload detection circuit 69 is configured to detect a power overload condition and change the operating state of controller 30 to reduce the output power delivered to load 15. To facilitate this operation, circuit 69 includes a power overload comparator 61 and a transconductance amplifier 70. If the value of the power required by load 15 increases, the value of the output voltage decreases thereby decreasing the current through the optical emitter of coupler 18 and the FB signal on input 33 increases. Thus, the FB signal also carries information about the power consumed by system 10. If the value of the FB signal increases past a desired value, circuit 69 forms a control signal that changes the operating state of controller 30 to a power overload state that inhibits the switching control signal thereby inhibiting the switching of transistor 20 and decreasing the power dissipation of system 10. In order to ensure that circuit 69 accurately detects the power overload condition, controller 30 uses a power overload reference signal that is derived from the bulk voltage on node 21. The power overload reference signal is proportional to the bulk voltage and varies proportionally to variations in the bulk voltage. In the preferred embodiment, the power overload reference signal is a reference voltage formed by a resistor divider that is connected between nodes 21 and 22. The resistor divider includes a resistor 80, a resistor 81, a resistor 82, and a resistor 83 that are connected in series between nodes 21 and 22. A node 86 is formed at the connection between resistors 80 and 81, a node 87 is formed at the connection between resistors 81 and 82, and a node 88 is formed at the connection between resistors 82 and 83. The voltage formed at node 86 is used by brown-out comparator 59 to sense the value of the bulk voltage and detect a brown-out condition as is well known in the art. Thus, the voltage at node 86 is not a reference voltage. The voltage formed at node 87 provides a power overload reference signal for power overload detection and the voltage formed at node 87 provides a skip mode reference signal for skip mode detection. Those skilled in the art will appreciate that resistors 80 through 83 could be formed as three separate resistor dividers or two resistor dividers instead of the one resistor divider that is illustrated in FIG. 1. Additionally, the reference voltages may be formed by other well-known techniques as long as the reference voltages are derived from the bulk voltage and vary proportionally to variations in the bulk voltage and preferably vary inversely proportionally. Those skilled in the art will understand that the tap points on the resistor divider may re-arranged and that some of the tap points, such as the brown-out and power overload, may be consolidated.

System 10 generally is designed to supply a rated amount of power assuming that the bulk voltage is at a lowest value that can be expected and to supply a rated amount of current at that voltage level. If the input voltage increases, then the amount of power consumed by system 10 at the rated current is greater than the rated power. The change in the bulk voltage value can arise from several sources. For example, plugging a device designed for United States power sources into a European power outlet, or vice versa. The value of the power overload reference signal is chosen to be representative of a value of the bulk voltage that results in system 10 consuming an amount of power that is greater than a desired amount of power that system 10 should supply. Thus, controller 30 facilitates detecting power dissipation that results from variations in the bulk voltage. Prior systems that used a fixed reference voltage to detect power dissipation could not detect increased power dissipation resulting from variations in the bulk voltage.

Controller 30 receives the power overload reference signal of node 87 on a power overload reference input 36 of controller 30. Amplifier 70 inverts the reference signal, adds an offset from the reference voltage that is received from output 57 of reference 52, and forms an amplified reference signal on the output of amplifier 70. The offset sets the common mode of the amplified reference signal to make sure that the range of output values of amplifier 70 is within the range of the FB signal. The amplified reference signal on the output of amplifier 70 varies inversely proportional to variations in the bulk voltage on node 21. In the preferred embodiment, the amplified reference signal is approximately equal to:

$$Vamp = K(Vref - Vblk)$$

where
  K=a constant,
  Vref=the power overload reference signal, and
  Vblk=the bulk voltage on node 21.

Thus, amplifier 70 forms a reference signal that varies inversely proportionally to variations of the bulk voltage. Comparator 61 receives the amplified reference signal and compares it to the FB signal. In normal operation with the value of the bulk voltage approximately equal to the value for which system 10 was designed, the value of the FB signal remains less than the value of the amplified reference signal. If the value of the bulk voltage increases, the value of the amplified reference signal decreases. If the value of the amplified reference signal decreases below the value of the FB signal, the control signal on the output of comparator 61 goes low. The low control signal is received by gate 75 which blocks the output of latch 47 forcing the switching control signal low and inhibiting the switching of transistor 20. Inhibiting the switching of transistor 20 prevents energy transfers through transformer 12 thereby lowering the power dissipation of system 10. Thus, using the value of the bulk voltage to determine the amount of output power supplied by system 10 more accurately detects system 10 supplying power greater than the desired maximum output power including output power supplied as a result of changes in the bulk voltage. Those skilled in the art will appreciate that the FB signal may also be formed to vary inversely proportionally to changes in the input voltage by exchanging the power overload reference signal from amplifier 70 with and the FB signal from comparator 61.

Controller 30 also uses the bulk voltage for setting controller 30 into the skip mode of operation. Typically, system 10 is designed to use the highest expected value of the bulk voltage for setting the value of the skip mode reference signal that will result in entering the skip mode. In operation if the value of the bulk voltage is less than the maximum value, the value of the FB signal that results in entering the skip mode also becomes lower. Thus the threshold value of the power required or used by load 15 to enter the skip mode decreases as the value of the bulk voltage decreases. This correspondence prevents controller 30 and system 10 from entering the skip mode at prior to load 15 reducing the amount of power that is required by load 15. Controller 30 receives the skip mode reference signal from node 88 on a skip mode reference input 37 of controller 30. Comparator 58 receives the skip mode reference signal and compares it to the FB signal. If the value of the skip mode reference signal is less than the FB signal, the output of comparator 58 goes low to place controller 30 and system 10 in the skip mode of operation. The low from comparator 58 is received by gate 75 which blocks the output of latch 47 forcing the switching control signal low and inhibiting the switching of transistor 20. Inhibiting the switching of transistor 20 prevents energy transfers through transformer 12 thereby lowering the power dissipation of system 10. Thus, using the value of the bulk voltage to determine the amount of power consumption at which to enter the skip mode of operation allows system 10 to accurately enter the skip mode for a desired value of power supplied to load 15 as the value of the bulk voltage changes. Thus, system 10 more accurately detects system 10 supplying less power to load 15. One example of a power supply controller that includes a skip mode function is disclosed in U.S. Pat. No. 6,597,221 issued to Jefferson Hall et al on Jul. 22, 2003 which is hereby incorporated herein by reference To facilitate implementing this operational functionality, a first terminal of resistor 80 is connected to node 21 and a second terminal is connected to a first terminal of resistor 81 and to input 35. A second terminal of resistor 81 commonly connected to input 36 and a first terminal of resistor 82. A second terminal of resistor 82 is commonly connected to input 37 and a first terminal of resistor 83 which has a second terminal connected to node 22. A power supply terminal of regulator 51 is connected to input 31 and a power return terminal of regulator 51 is connected to return 32. A voltage output of regulator 51 is connected to a first terminal of resistor 55 which has a second terminal connected to input 33. An inverting input of comparator 46 is commonly connected to input 33, a non-inverting input of comparator 61, and a non-inverting input of comparator 58. A non-inverting input of comparator 46 is connected to an output of optional LEB 53 which has an input connected to input 34. An output of comparator 46 is connected to the reset input of latch 47. A set input of latch 47 is connected to the output of clock 44. A Q bar output of latch 47 is connected to a first input of gate 75. A non-inverting input of comparator 59 is connected to input 35 and an inverting input of comparator 59 is connected to output 56 of reference 52. An output of comparator 59 is connected to a second input of gate 75. A non-inverting input of amplifier 70 is connected to output 57 of reference 52. An inverting input of amplifier 70 is commonly connected to a first terminal of a resistor 71 and a first terminal of a resistor 72. A second terminal of resistor 71 is connected to input 36. Second terminal of resistor 72 is commonly connected to the output of amplifier 70 and an inverting input of comparator 61. The output of comparator 61 is connected to a third input of gate 75. A fourth input of gate 75 is connected to the output of comparator 58. A fifth input of gate 75 is connected to an output of UVLO 54 which has an input connected to input 31.

Figure 2:
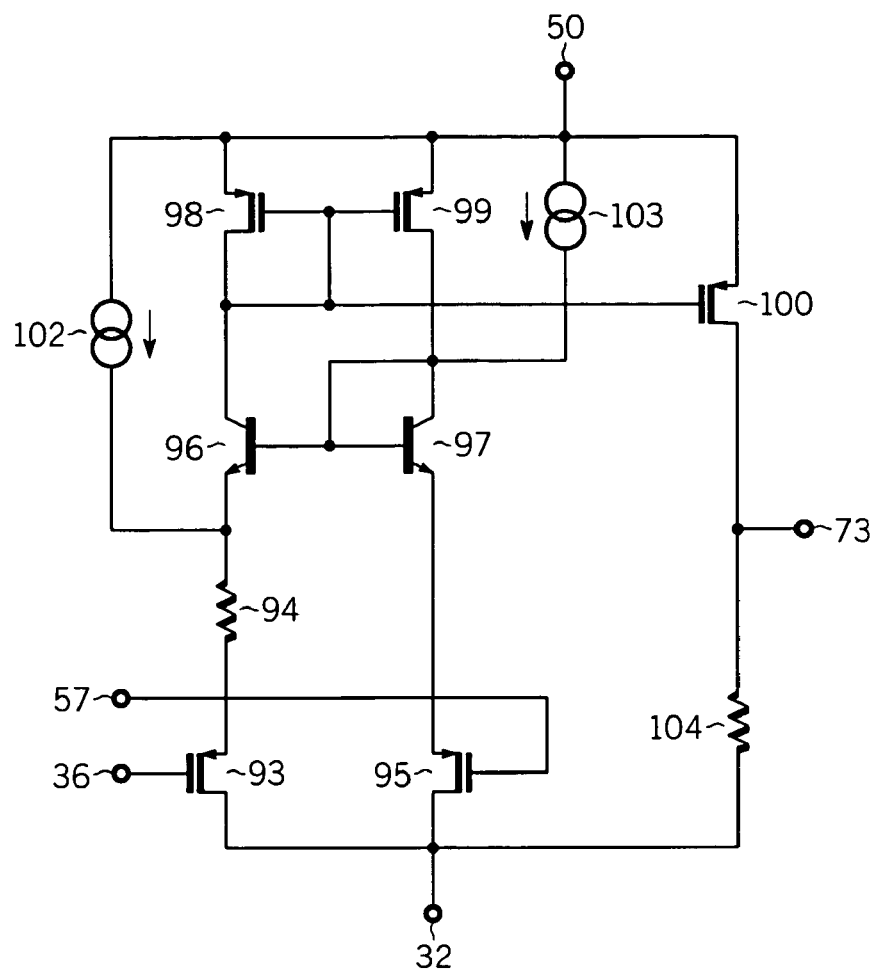
FIG. 2 schematically illustrates portion of an embodiment of a power supply control system that is an alternate embodiment of the power supply control system of FIG. 1 in accordance with the present invention.

FIG. 2 schematically illustrates portion of an embodiment of a power overload detection circuit 92 that is an alternate embodiment of circuit 69 that was explained in the description of FIG. 1. Circuit 92 includes differential pair coupled transistors 93 and 95, current sources 102 and 103, level shifting transistors 96 and 97, resistors 94 and 104, and current mirror coupled transistors 98, 99, and 100. Transistor 93 receives the power overload reference signal from input 36 and transistor 95 receives the second reference signal from output 57 of reference 52. Current sources 102 and 103 provide a current to bias respective transistors 93 and 95. The voltage on the gate of transistor 95 is shifted up by the Vgs of transistor 95, shifted up again by the Vbe of transistor 97 and shifted down by the Vbe of transistor 96 and by the Vgs of transistor 93. Thus, if the power overload reference signal is equal to the second reference signal, there is no current flow through mirror transistors 98 and 100, thus, no voltage drop across resistor 104 and output 73 is substantially at the potential of return 32. If the power overload reference signal decreases and becomes less than the second reference signal, current flows through transistor 93 causing a voltage drop across resistor 94 and an equal current flow through transistor 98. The current through transistor 98 is mirrored by transistor 100 causing current flow through resistor 104 and forming an output voltage on output 73. Thus, as the power overload reference signal on input 36 decreases, the output voltage on output 73 increases. The absolute value of the output voltage depends upon the ratio between transistors 98 and 100. Thus, circuit 92 functions as an inverting amplifier with a gain determined by the ratio of the size of transistor 98 to the size of transistor 100. The implementation of circuit 92 minimizes the number of elements used to form an output that is inversely proportional to the input. Additionally, circuit 92 does not use a capacitor which further reduces the size of circuit 92.

In order to implement this functionality of circuit 92, a first terminal of source 102 is connected to output 50 and a second terminal is commonly connected to an emitter of transistor 96 and a first terminal of resistor 94. A second terminal of resistor 94 is connected to a source of transistor 93. A gate of transistor 93 is connected to input 36 and a drain is connected to return 32. A base of transistor 96 is commonly connected to a base and a collector of transistor 97, a drain of transistor 99, and to a first terminal of source 103. A collector of transistor 96 is commonly connected to a drain and a gate of transistor 98 and to a gate of transistors 99 and 100. A source of transistors 98, 99 and 100 is connected to a second terminal of source 103 and to output 50. An emitter of transistor 97 is connected to a source of transistor 95. A gate of transistor 95 is connected to input 57 and a drain is connected to return 32. A drain of transistor 100 is connected to output 73 and to a first terminal of resistor 104. A second terminal of resistor 104 is connected to return 32.

Figure 3:
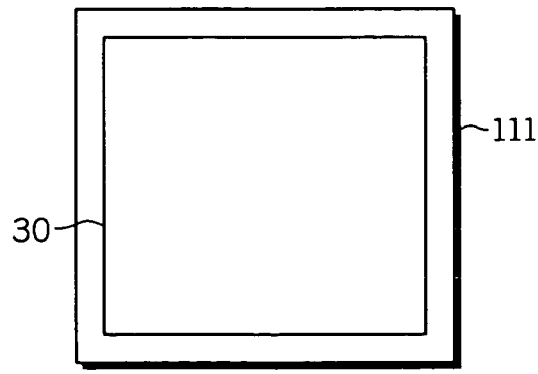
FIG. 3 schematically illustrates an enlarged plan view of a semiconductor device that includes at least a portion of the power supply control system of FIG. 1 or FIG. 2 in accordance with the present invention.

FIG. 3 schematically illustrates an enlarged plan view of a portion of an embodiment of a semiconductor device 110 that is formed on a semiconductor die 111. Controller 30 is formed on die 111. Die 111 may also include other circuits that are not shown in FIG. 3 for simplicity of the drawing. Controller 30 and device 110 are formed on die 111 by semiconductor manufacturing techniques that are well known to those skilled in the art.

In view of all of the above, it is evident that a novel device and method is disclosed. Included, among other features, is forming a power supply controller to use a value of the bulk voltage to form a reference signal for controlling the power overload operating mode of the power supply controller. Additionally the bulk voltage is also used to form a reference signal for controlling the skip mode of the power supply controller. Using the bulk voltage for forming the reference signals facilitates more accurately determining the power dissipation to control the power supply controller to operate in the power overload mode, and to operate in the skip mode.

While the invention is described with specific preferred embodiments, it is evident that many alternatives and variations will be apparent to those skilled in the semiconductor arts. For example, the FB signal received on input 33 may be inverted, such as by an amplifier, instead of inverting the power overload reference signal. The word "connected" is used throughout for clarity of the description, however, it is intended to have the same meaning as the word "coupled". Accordingly, "connected" should be interpreted as including either a direct connection or an indirect connection.

The invention claimed is:

1. A method of forming a power overload detection circuit of a switching power supply system comprising:
   configuring the power overload detection circuit to use a reference signal derived from and representative of a bulk voltage wherein the bulk voltage is used to form an output voltage of the switching power supply system and wherein variations of the reference signal are representative of variations of the bulk voltage;
   configuring the switching power supply system to receive a feedback signal that is representative of the output voltage and to use the feedback signal to regulate a value of the output voltage; and
   configuring the power overload detection circuit to compare the feedback signal to the reference signal to detect power delivered to a load exceeding a predetermined rated maximum value as a result of an increase in the bulk voltage and responsively reduce power supplied to the load.

2. The method of claim 1 wherein configuring the power overload detection circuit to compare the feedback signal to the reference signal includes configuring the power overload detection circuit to set a power overload operating state.

3. The method of claim 1 wherein configuring the power overload detection circuit to use the reference signal derived from the bulk voltage includes configuring the power overload detection circuit to form the reference signal to vary inversely proportional to variations in the bulk voltage.

4. The method of claim 1 wherein configuring the power overload detection circuit to use the reference signal derived from the bulk voltage includes configuring a transconductance amplifier to receive the reference signal and responsively form an amplified reference signal that varies inversely proportional to the reference signal.

5. The method of claim 4 wherein configuring the transconductance amplifier to receive the reference signal and responsively form the amplified reference signal that varies inversely proportional to the reference signal includes configuring a comparator to compare the feedback signal to the amplified reference signal.

6. The method of claim 1 wherein configuring the power overload detection circuit to use the reference signal derived from the bulk voltage includes coupling a single amplifier to form the reference signal to vary inversely proportional to variations in the bulk voltage.

7. The method of claim 6 wherein coupling the single amplifier to form the reference signal to vary inversely proportional to variations in the bulk voltage includes coupling a differential coupled transistor pair to receive a signal representative of the bulk voltage and to receive a fixed reference signal, and also includes coupling the transistor pair to a current mirror.

8. The method of claim 7 wherein coupling the transistor pair to the current mirror includes configuring a resistor divider to form a voltage that is proportional to the bulk voltage, coupling the transistor pair to receive the voltage that is proportional to the bulk voltage and responsively form a mirror current through the current mirror.

9. The method of claim 1 wherein configuring the power overload detection circuit to use the reference signal derived from the bulk voltage includes configuring the switching power supply system to form a fixed reference voltage and to subtract a signal that is representative of the bulk voltage from the fixed reference signal to form the reference signal that is representative of the bulk voltage to vary inversely proportionally to the variations of the bulk voltage.

10. A method of forming a skip cycle comparator of a power supply system comprising:
    configuring the skip cycle comparator to receive a reference signal derived from a bulk voltage used to form an output voltage of the power supply system wherein the reference signal is representative of the bulk voltage and varies responsively to variations in the bulk voltage;
    configuring a switching control circuit of a power supply controller of the power supply system to receive a feedback signal that is representative of the output voltage and to use the feedback signal to regulate a value of the output voltage; and
    configuring the skip cycle comparator to compare the feedback signal to the reference signal and responsively initiate entering a skip cycle mode and to decrease a threshold value for entering the skip cycle mode as the bulk voltage decreases.

11. The method of claim 10 wherein configuring the skip cycle comparator to compare the feedback signal to the reference signal includes configuring the skip cycle comparator to set the operating state to the skip cycle mode responsively to the feedback signal being less than a first value.

12. The method of claim 10 wherein configuring the skip cycle comparator to receive the reference signal derived from the bulk voltage includes coupling a resistor divider to form a reference voltage that is proportional to the bulk voltage.

13. The method of claim 12 wherein configuring the skip cycle comparator to compare the feedback signal to the reference signal includes coupling the skip cycle comparator to compare the feedback signal to the reference voltage.

14. The method of claim 13 wherein configuring the skip cycle comparator to compare the feedback signal to the reference signal includes coupling an output of the skip cycle comparator to a control circuit that inhibits switching a power switch used to regulate the output voltage.

15. The method of claim 12 wherein coupling the resistor divider to form the reference voltage that is proportional to the bulk voltage includes forming the switching power supply controller on a semiconductor die and forming the resistor divider externally to the semiconductor die.

16. A switching power supply controller configured to form a drive signal operable to control a power switch to use a bulk voltage and form a regulated output voltage comprising:

a skip cycle comparator coupled to receive a first reference signal derived from the bulk voltage and to receive a feedback signal that is representative of the regulated output voltage wherein the skip cycle comparator is configured to compare the feedback signal to the first reference signal and responsively initiate entering a skip cycle mode and to decrease a threshold value for entering the skip cycle mode as the bulk voltage decreases wherein the first reference signal varies responsively to variations in the bulk voltage; and a power overload detection circuit configured to compare the feedback signal to a second reference signal that is derived from and is representative of the bulk voltage to detect power delivered to the load exceeding a predetermined rated maximum value as a result of an increase in the bulk voltage and responsively reduce power supplied to the load.

17. The switching power supply controller of claim 16 wherein the skip cycle comparator coupled to receive the first reference signal includes a resistor divider coupled to receive the bulk voltage and form the first reference signal as a reference voltage that is proportional to the bulk voltage.

18. The switching power supply controller of claim 16 wherein the power overload detection circuit includes differential coupled transistors configured to receive a signal representative of the bulk voltage, a current mirror configured to receive a first current from the differential coupled transistors and form a second current that is inversely proportional to variations in the bulk voltage, and a resistor coupled to convert the second current to a voltage that is inversely proportional to variations in the bulk voltage.

19. The switching power supply controller of claim 16 wherein the power overload detection circuit is operably coupled to form a variable reference current to vary inversely proportional to variations in the bulk voltage.

20. The switching power supply controller of claim 16 wherein the power overload detection circuit includes a transconductance amplifier coupled to receive a reference voltage that is proportional to the bulk voltage and to form an amplified reference voltage that varies inversely proportionally to variations in the bulk voltage.

* * * * *